(12) United States Patent
Wu et al.

(10) Patent No.: US 8,090,213 B2
(45) Date of Patent: Jan. 3, 2012

(54) IMAGE PROCESSING DEVICE AND METHOD

(75) Inventors: Yen-Hsing Wu, Hsin-Chu Hsien (TW); Chun-Hsing Hsieh, Hsin-Chu (TW); Chi-Feng Wang, Taipei Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1365 days.

(21) Appl. No.: 11/672,524

(22) Filed: Feb. 8, 2007

(65) Prior Publication Data

US 2007/0189632 A1 Aug. 16, 2007

(30) Foreign Application Priority Data

Feb. 14, 2006 (TW) ................. 95104952 A

(51) Int. Cl.
*G06K 9/40* (2006.01)
*G06K 9/38* (2006.01)
*H04N 5/14* (2006.01)
*H04N 5/00* (2011.01)
*H04N 9/64* (2006.01)

(52) U.S. Cl. ........ 382/266; 382/254; 382/262; 382/263; 382/269; 382/273; 348/571; 348/606

(58) Field of Classification Search ............... 382/254, 382/266; 348/571, 606
See application file for complete search history.

(56) References Cited

U.S. PATENT DOCUMENTS

| | | |
|---|---|---|
| 4,334,244 A | 6/1982 | Chan et al. |
| 4,935,806 A | 6/1990 | Rabii |
| 5,119,179 A | 6/1992 | Hagino |
| 5,311,306 A | 5/1994 | Tanaka |
| 5,345,407 A | 9/1994 | Hostetler |
| 5,426,470 A | 6/1995 | Kita |
| 5,548,342 A | 8/1996 | Ikeda |
| 5,920,357 A * | 7/1999 | Ohara ............... 348/625 |
| 5,959,693 A * | 9/1999 | Wu et al. ........... 348/624 |
| 6,380,973 B1 | 4/2002 | Kawahara |
| 6,498,609 B1 * | 12/2002 | De Haan et al. ...... 345/589 |
| 7,110,045 B2 | 9/2006 | Ishihara |
| 7,224,406 B2 * | 5/2007 | Lee et al. .......... 348/630 |
| 7,289,163 B2 * | 10/2007 | Lin et al. ........... 348/631 |
| 7,345,711 B2 * | 3/2008 | Takahashi .......... 348/625 |
| 7,382,915 B2 * | 6/2008 | Bala et al. .......... 382/162 |
| 7,454,081 B2 * | 11/2008 | Demas et al. ....... 382/268 |
| 2002/0140854 A1 | 10/2002 | Lan |
| 2004/0155983 A1 | 8/2004 | Topper |

FOREIGN PATENT DOCUMENTS

| | | |
|---|---|---|
| JP | 63-260276 | 10/1988 |
| JP | 2004-166010 | 6/2004 |
| KR | 2001-0005282 | 1/2001 |

OTHER PUBLICATIONS

Al Bovik, "Handbook of Image & Video processing", p. 51~268, Year: 2000.

* cited by examiner

*Primary Examiner* — Brian Q Le
*Assistant Examiner* — Jose M Torres
(74) *Attorney, Agent, or Firm* — Thomas, Kayden, Horstemeyer & Risley, LLP

(57) ABSTRACT

An image processing device includes: a peaking filter for performing peaking processing on an input image signal to generate a peaking image signal; a selection circuit, coupled to the peaking filter, for selecting a plurality of pixels within the peaking image signal; and a median filter, coupled to the selection circuit, for filtering the plurality of pixels within the peaking image signal to generate a filtered image signal.

17 Claims, 2 Drawing Sheets

IMAGE PROCESSING DEVICE AND METHOD

BACKGROUND OF THE INVENTION

1. Field of the Invention

The present invention relates to image processing, and more particularly, to image processing devices and methods capable of reducing overshoot/undershoot effects at edges of images while performing peaking processing.

2. Description of the Prior Art

In image processing, peaking processing can make edges of video objects in an image clearer and make color(s) of the video objects and color(s) of the background distinct from each other. Overshoot/undershoot effects may occur after peaking processing, however. In a typical situation of the overshoot/undershoot effects, abnormal phenomena may occur at the edges of the video objects, causing an extremely unnatural appearance of the video objects.

SUMMARY OF THE INVENTION

It is an objective of the claimed invention to provide image processing devices and methods to reduce or remove overshoot/undershoot effects.

According to one embodiment of the claimed invention, an image processing device is disclosed. The image processing device comprises: a peaking filter for performing peaking processing on an input image signal to generate a peaking image signal; a selection circuit, coupled to the peaking filter, for selecting a plurality of pixels within the peaking image signal; and a median filter, coupled to the selection circuit, for filtering the pixels to generate a filtered image signal.

According to one embodiment of the claimed invention, an image processing method is disclosed. The image processing method comprises: performing peaking processing on an input image signal to generate a peaking image signal; selecting a plurality of pixels within the peaking image signal and the input image signal; and determining a chrominance value of a target pixel within the input image signal according to chrominance values of the pixels.

According to one embodiment of the claimed invention, an image processing method is disclosed. The image processing method comprises: performing peaking processing on an input image signal to generate a peaking image signal; selecting a plurality of pixels within the peaking image signal; and performing median filtering on the pixels to generate a filtered image signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
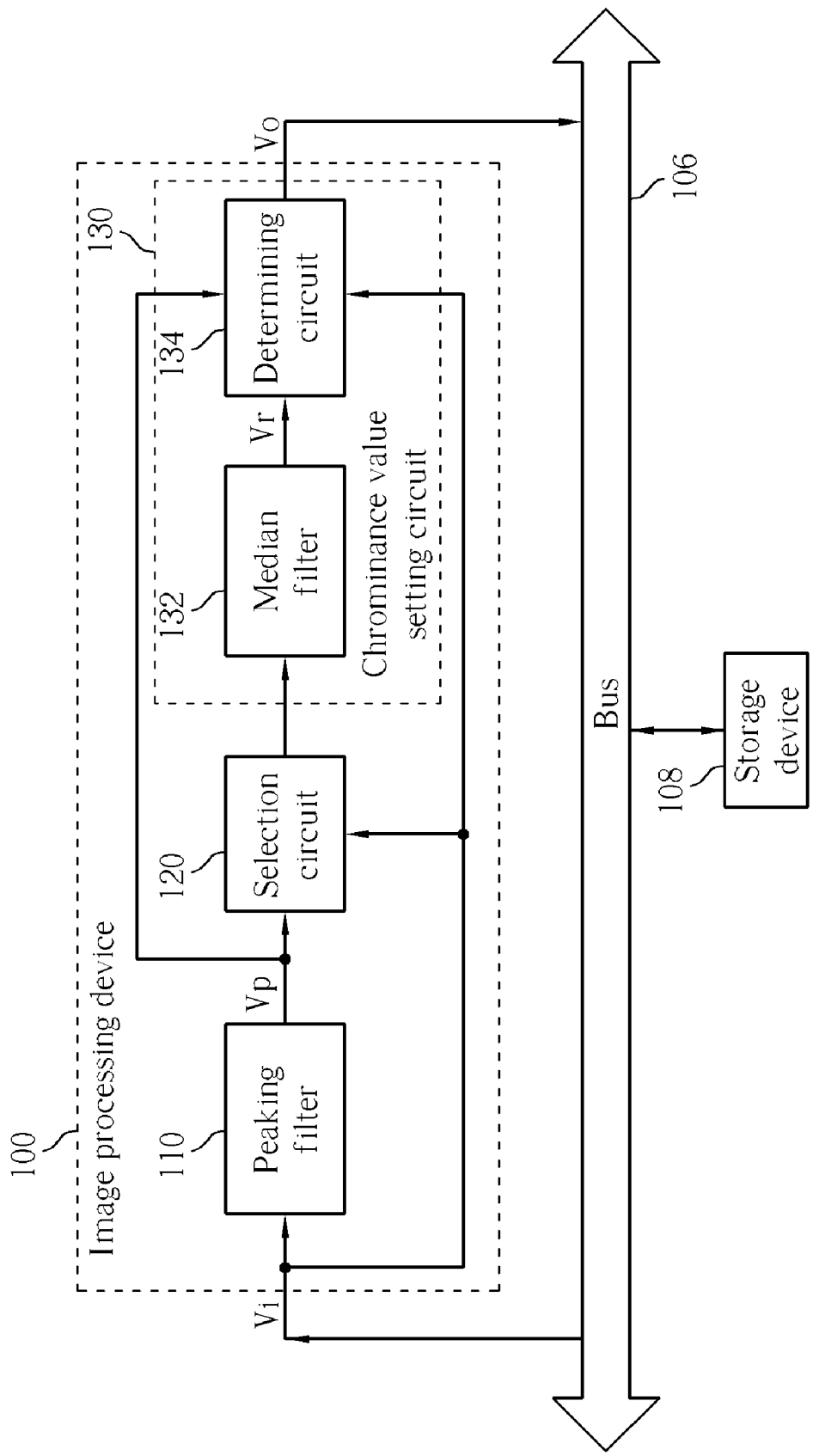
FIG. 1 is a diagram of an image processing device according to one embodiment of the present invention.

Please refer to FIG. 1. FIG. 1 illustrates a diagram of an image processing device 100 according to one embodiment of the present invention. The image processing device 100 in this embodiment is coupled to a storage device 108 such as a frame buffer through a bus 106. The image processing device 100 comprises a peaking filter 110, a selection circuit 120, and a chrominance value setting circuit 130, where the chrominance value setting circuit 130 comprises a median filter 132 and a determining circuit 134.

The peaking filter 110 performs peaking processing on an input image signal Vi to generate a peaking image signal Vp. Typically, the peaking filter 110 can be implemented with a circuit equivalent to a high pass filter, so as to make edges of video objects in an image sharper and clearer. According to this embodiment, the input image signal Vi is generated according to image data stored in the storage device 108, where the image data has luminance values and chrominance values of a plurality of pixels of a frame, and the input image signal Vi carries the chrominance values of the pixels. Thus, by utilizing the peaking filter 110 to perform peaking processing, the image processing device 100 may make color(s) of at least one video object within the frame and color(s) of the background thereof distinct from each other. According to different embodiments of the present invention, the chrominance values can be chrominance values corresponding to different chrominance coordinates. For example: chrominance values Cb and/or Cr corresponding to the chrominance coordinate (Y, Cb, Cr); and chrominance values U and/or V corresponding to the chrominance coordinate (Y, U, V). In the embodiment shown in FIG. 1, the chrominance coordinate (Y, Cb, Cr) is utilized for related descriptions thereof, and the image processing device 100 processes the chrominance values Cb and Cr in the frame, respectively.

In order to prevent from overshoot/undershoot effects that would probably occur in the frame while performing peaking processing, this embodiment selectively adjusts the chrominance values carried by the peaking image signal Vp by utilizing the chrominance value setting circuit 130. More particularly, the chrominance value setting circuit 130 selectively adjusts the chrominance values of the pixels around the edges of the at least one video object (i.e. the one or more video objects). The selection circuit 120 selects a plurality of pixels within the peaking image signal Vp and the input image signal Vi, and the chrominance value setting circuit 130 determines a chrominance value of a target pixel within the input image signal Vi according to the chrominance values of the pixels. According to this embodiment, the target pixel is located at an edge of the video object. In addition, the pixels comprise two neighboring pixels of the target pixel within the input image signal Vi, and a reference pixel corresponding to the target pixel within the peaking image signal Vp, where the two neighboring pixels are located at two sides of the target pixel, and each of the two neighboring pixels is at a predetermined distance from the target pixel. For example, the predetermined distance can be a unit distance between two adjacent pixels along the X-axis of the image represented by the frame, or a multiple of the unit distance. In this embodiment, the predetermined distance is the unit distance between two adjacent pixels along the X-axis of the image represented by the frame.

The median filter 132 determines a median of the chrominance values of the pixels, and the determining circuit 134 determines whether the initial value of the chrominance value of the target pixel is between the median and the chrominance value of the reference pixel mentioned above. If the initial value is not between the median and the chrominance value of the reference pixel, the determining circuit 134 sets the chrominance value of the target pixel as the median. Thus, as long as an adjustment tendency of the target pixel by the median filter 132 and an adjustment tendency of the target pixel by the peaking filter 110 are identical (for example, both the chrominance value of the reference pixel and the median are greater than the initial value, or both the chrominance value of the reference pixel and the median are less than the initial value), the determining circuit 134 sets the chrominance value of the target pixel as the median, to reduce or remove the overshoot/undershoot effects mentioned above. In brief, the median filter 132 processes a plurality of pixels in the peaking image signal Vp and generates a filtered image signal Vr for utilization by the determining circuit 134, and the determining circuit 134 outputs an output image signal Vo according to a predetermined criterion, where the output image signal Vo can be one of the input image signal Vi, the peaking image signal Vp, or the filtered image signal Vr.

Figure 2:
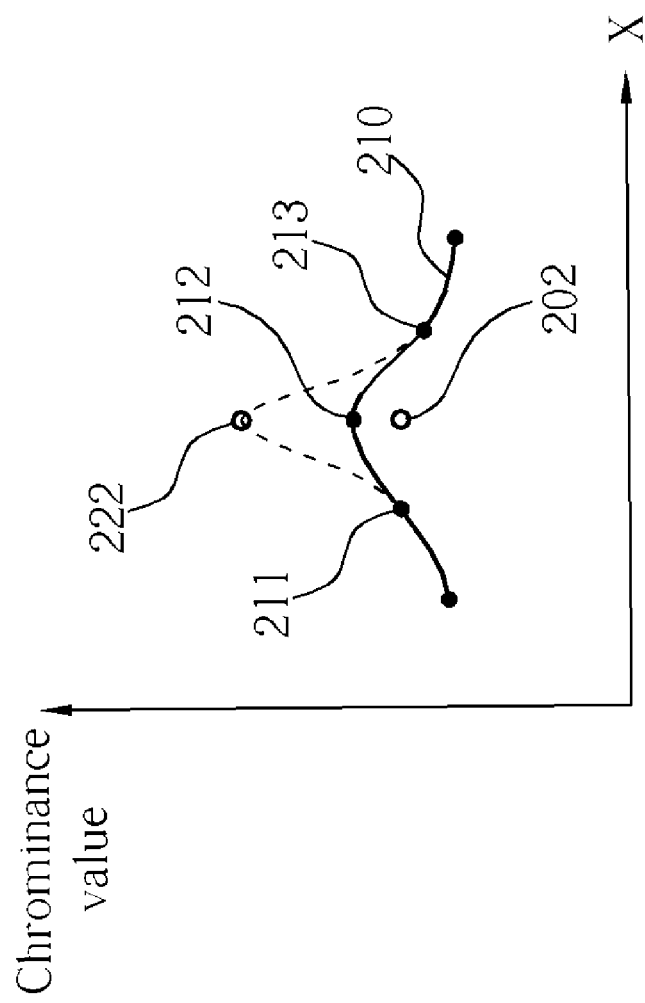
FIG. 2 illustrates an image processing method utilized by the determining circuit shown in FIG. 1 for maintaining the chrominance value of the target pixel to be substantially equal to the initial value.

Conversely, if the initial value is between the median and the chrominance value of the reference pixel, the determining circuit 134 maintains the chrominance value of the target pixel to be substantially equal to the initial value. As shown in FIG. 2, the curve 210 is a distribution curve of the chrominance values (for example, the chrominance values Cb or Cr) carried by the input image signal Vi along the X-axis of the image represented by the frame, where the chrominance value 212 represents the initial value, the chrominance values 211 and 213 represent the chrominance values of the two neighboring pixels of the target pixel, and the chrominance value 222 represents the reference pixel's chrominance value corresponding to the peaking process result as represented by the dashed line shown in FIG. 2. As a result, the median filter 132 determines the median of the chrominance values 211, 212, and 213 of the pixels as the chrominance value 202, whose value is equal to that of the chrominance value 211 in the situation shown in FIG. 2. As the chrominance distribution shown by the curve 210 usually corresponds to a high frequency image variation in the frame, causing the adjustment tendency of the target pixel by the median filter 132 and the adjustment tendency of the target pixel by the peaking filter 110 to be different from each other (for example, the chrominance value 222 and the median 202 are not both greater than the chrominance value 212, or the chrominance value 222 and the median 202 are not both less than the chrominance value 212), the determining circuit 134 will maintain the chrominance value of the target pixel as substantially equal to the initial value, in order to prevent the high frequency image variation in the frame from being filtered out.

In a variation of this embodiment, it is not necessary to install a determining circuit such as the determining circuit 134 mentioned above, where the median filter 132 of this variation determines the median of the chrominance values of the pixels as the chrominance value of the target pixel. In this variation, the high frequency image variation mentioned above is typically filtered out.

In another variation of this embodiment, the image processing method implemented by utilizing the image processing device 100 can be executed more than once, where the processing result represented by the output image signal Vo can be the input image signal Vi utilized at a next time of processing, so as to make color(s) of the video object within the frame and color(s) of the background distinct from each other.

It is an advantage of the present invention that, while performing peaking processing, the image processing devices and methods provided by the present invention can make color(s) of the video object within the frame and color(s) of the background distinct from each other, and reduce or remove the overshoot/undershoot effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing device for determining an output image signal according to an input image signal, the input image signal comprising a value representing a target pixel, the image processing device comprising:
    a peaking filter for performing peaking processing on the input image signal to generate a peaking image signal;
    a selection circuit for selecting a plurality of values representing neighboring pixels from the input image signal and a reference pixel from the peaking image signal, the reference pixel corresponding to the target pixel and the neighboring pixels adjacent to the target pixel;
    a median filter, coupled to the selection circuit, for generating a filtered image signal according to chrominance values of the neighboring pixels and the reference pixel; and
    a determining circuit, coupled to the peaking filter and the median filter, for determining the output image signal according to a chrominance value of the target pixel, a chrominance value of the filtered image signal and the chrominance value of the reference pixel.

2. The image processing device of claim 1, wherein the filtered image signal is outputted as a target pixel value of the output image signal.

3. The image processing device of claim 1, wherein the determining circuit outputs one of the filtered image signal and the value representing the target pixel of the input image signal as a target pixel value of the output image signal.

4. The image processing device of claim 3, wherein the determining circuit outputs the target pixel value of the input image signal as the target pixel value of the output image signal when the chrominance value of the target pixel value of the input image signal is between the chrominance value of the filtered image signal and the chrominance value of the reference pixel, and the determining circuit outputs the filtered image signal as the target pixel value of the output image signal when the chrominance value of the target pixel value of the input image signal is not between the chrominance value of the filtered image signal and the chrominance value of the reference pixel.

5. The image processing device of claim 1, wherein the output image signal is fed back as the input image signal.

6. The image processing device of claim 1, wherein the peaking filter comprises a high pass filter for performing peaking processing.

7. The image processing device of claim 1, wherein each of the neighboring pixels is separated from the target pixel for a predetermined distance.

8. The image processing device of claim 1, wherein the input image signal is in a YUV color space or a YCbCr color space.

9. An image processing method for determining an output image signal according to an input image signal, the input image signal comprising a value representing a target pixel, the image processing method comprising:
    performing peaking processing on the input image signal to generate a peaking image signal;
    selecting a plurality of values representing neighboring pixels from the input image signal and a reference pixel from the peaking image signal, the reference pixel corresponding to the target pixel and the neighboring pixels adjacent to the target pixel;

utilizing a median filter to generate a filtered image signal according to chrominance values of the neighboring pixels and the reference pixel; and determining the output image signal according to a chrominance value of the target pixel, a chrominance value of the filtered image signal and the chrominance value of the reference pixel.

10. The image processing method of claim 9, wherein the filtered image signal is outputted as a target pixel value of the output image signal.

11. The image processing method of claim 9, wherein the step of determining the output image signal comprises:

outputting one of the filtered image signal and the value representing the target pixel of the input image signal as a target pixel value of the output image signal.

12. The image processing method of claim 11, wherein the step of determining the output image signal comprises:

outputting the value representing the target pixel of the input image signal as the target pixel value of the output image signal when the chrominance value of the target pixel of the input image signal is between the chrominance value of the filtered image signal and the chrominance value of the reference pixel, and outputting the filtered image signal as the value representing the target pixel of the output image signal when the chrominance value of the target pixel of the input image signal is not between the chrominance value of the filtered image signal and the chrominance value of the reference pixel.

13. The image processing method of claim 9, wherein the output image signal is fed back as the input image signal.

14. The image processing method of claim 9, wherein the step of performing peaking processing comprises:

utilizing a high pass filter to perform peaking processing.

15. The image processing method of claim 9, wherein each of the neighboring pixels is away separated from the target pixel for a predetermined distance.

16. The image processing method of claim 9, wherein the input image signal is in a YUV color space or a YCbCr color space.

17. An image processing device for determining an output image signal according to an input image signal, the input image signal comprising a value representing a target pixel, the improvement comprising:

a determining circuit, coupled to a peaking filter and a median filter, for determining the output image signal according to a chrominance value of the target pixel, a chrominance value of a filtered image signal and a chrominance value of a reference pixel; and a selection circuit for selecting a plurality of values representing neighboring pixels from the input image signal and the reference pixel from a peaking image signal, the reference pixel corresponding to the target pixel and the neighboring pixels adjacent to the target pixel.

* * * * *